United States Patent [19]

Ireland

[11] Patent Number: 4,573,765

[45] Date of Patent: Mar. 4, 1986

[54] DISPERSIVE PRISM ARRANGEMENT

[75] Inventor: Clive L. M. Ireland, Rugby, England

[73] Assignee: J. K. Lasers Limited, Warwickshire, England

[21] Appl. No.: 638,711

[22] Filed: Aug. 8, 1984

[30] Foreign Application Priority Data

Aug. 20, 1983 [GB] United Kingdom ............... 8322478

[51] Int. Cl.$^4$ .................................................. G02B 5/04
[52] U.S. Cl. ..................................... 350/286; 350/168; 350/287
[58] Field of Search .................... 350/168, 286, 287

[56] References Cited

U.S. PATENT DOCUMENTS

| | | | |
|---|---|---|---|
| 2,821,111 | 1/1958 | Coleman | 350/286 |
| 3,871,750 | 3/1975 | Mecklenbors | 350/286 |
| 4,294,546 | 10/1981 | Killman et al. | 350/286 |

Primary Examiner—Bruce Y. Arnold
Assistant Examiner—William Propp
Attorney, Agent, or Firm—Watson, Cole, Grindle & Watson

[57] ABSTRACT

A dispersive prism arrangement comprises a pair of identical triangular prisms each of which is mounted on a platform. The two platforms are rotatably mounted on a common shaft which slides in a groove and each platform is also mounted on a respective shaft which slides in a respective groove. These two further shafts are biased outwardly by springs. The two prisms are symmetrically disposed about the common shaft. Equal but opposite rotation may be imparted to the two prisms by rotating a knob which drives the common shaft.

A multiwavelength input beam incident on the first face of the first prism is refracted at this face, reflected at the second and third faces, emerges after refraction at the second face, and makes a symmetrical passage through the second prism. The prisms may be rotated so that each component of the beam emerges from the second prism without offset or deviation relate to the input beam.

6 Claims, 4 Drawing Figures

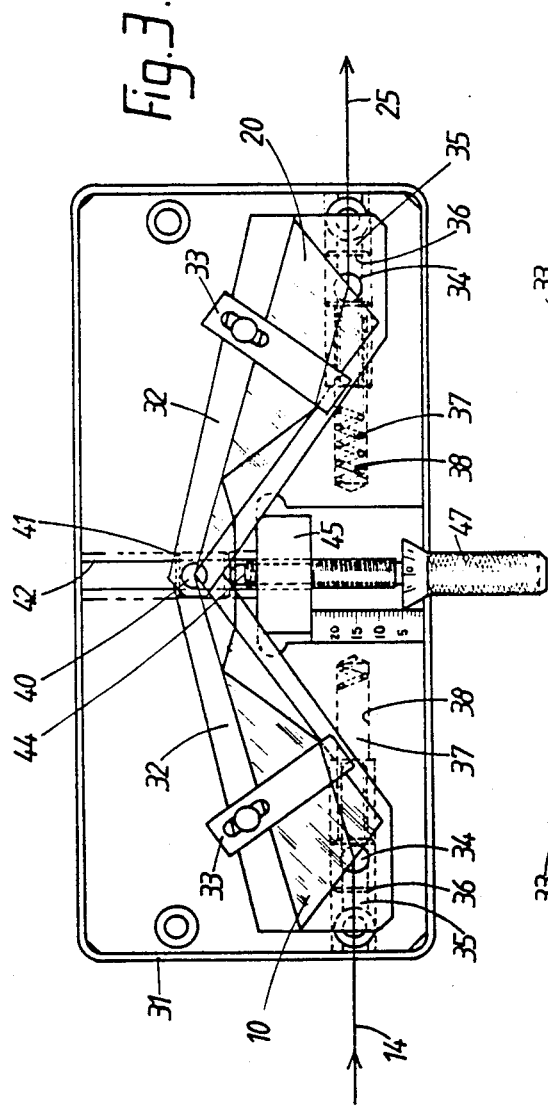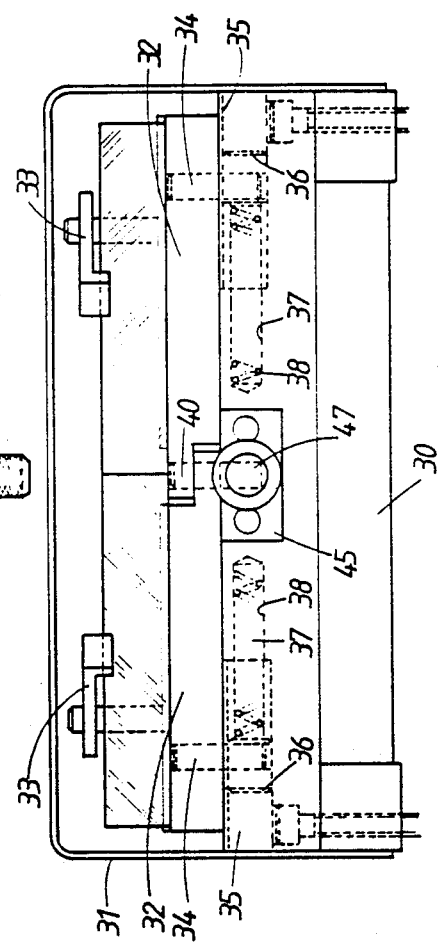

DISPERSIVE PRISM ARRANGEMENT

This invention relates to a dispersive prism arrangement.

There are many situations requiring dispersion of multi-wavelength optical beams so that a particular component can be isolated and in most situations it is required to isolate each component of the beam in turn. Dispersion of high energy optical beams can be achieved with either dichroic mirrors or optical prisms. Dichroic mirrors suffer from the disadvantage that they are narrow band and that they are prone to optically induced damage at high beam intensities. They are also expensive to manufacture.

The two types of dispersive prisms which are presently most commonly used are the simple triangular prism and the Pellin-Brocca prism. The simple triangular prism suffers from the disadvantage that it deviates the beam through approximately 60° and the Pellin-Brocca suffers from the disadvantage that it deviates the transmitted beam through approximately 90°. Two Pellin-Brocca prisms may be used in series to obtain a zero deviation but when they are so used the output beam is offset from the input beam.

It is accordingly an object of this invention to provide a new or improved prism arrangement in which zero deviation is achieved with a single prism.

According to one aspect of this invention there is provided a dispersive prism arrangement comprising a rotatably mounted prism having three faces which are inclined to each other so that when an input beam of a particular wavelength is incident on the first face the prism may be rotated to a position where the incident beam is refracted at the first face, the refracted beam from the first face is incident on the second face where it is reflected, the reflected beam from the second face is incident on the third face where it is reflected, the reflected beam from the third face is incident on the second face where it is refracted to form an output beam, and the output beam is at zero deviation from the input beam.

In the prism arrangement of this invention, dispersion is achieved without deviation and with using just a single prism.

The arrangement may include means for producing a multi-wavelength beam which is incident on the first face of the prism.

Preferably, the three faces of the prism are inclined to each other so that when the prism is rotated to a position where the shortest wavelength component of the beam emerges from the second face without deviation from the input beam the angle of inclination between the first and second faces is equal to twice the input angle at the first face and the angle of inclination between the second and third faces is equal to the difference between the input angle at the first face and the angle of refraction at the first face.

Conveniently, the arrangement includes a second rotatably mounted prism having three faces inclined to each other at the same angles as in the first prism, the two prisms being mounted with respect to each other so that an output beam from the second face of one prism is incident on the second face of the other prism.

Where two prisms are provided, zero deviation is achieved without offset between the input and the selected output beam component.

The arrangement may include a device for imparting equal but opposite rotation to the two prisms.

According to another aspect of this invention there is provided a prism arrangement comprising a pair of identical prisms each of which has three faces, the two prisms being rotatably mounted in a common plane and symmetrically disposed about a central point, and means for imparting equal but opposite rotation of the two prisms.

This invention will now be described in more detail by way of example with reference to the accompanying drawings, in which:

FIG. 3 is a detailed plan view of the two prism arrangement with the top part of the cover removed; and FIG. 4 is an elevational view of the arrangement shown in FIG. 3 with the side part of the cover removed.

Figure 1:
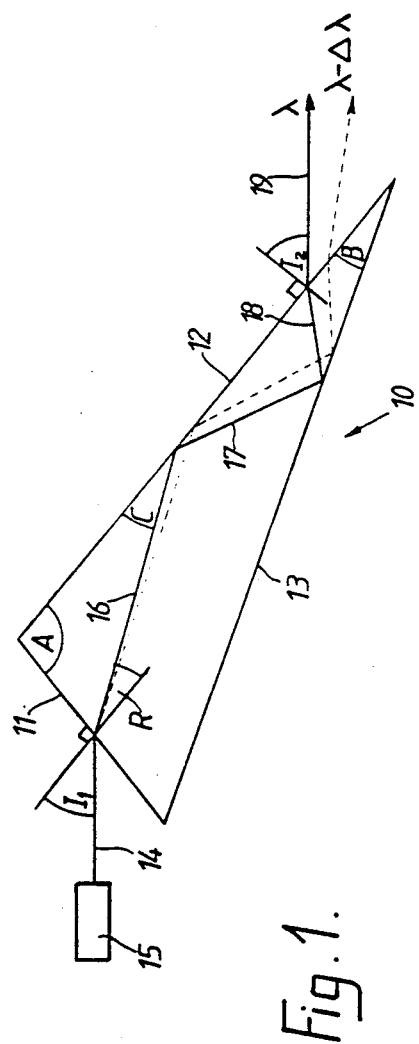
FIG. 1 is a diagram of a single prism arrangement embodying this invention.

Referring to FIG. 1, there is shown a triangular prism 10 having a first face 11, a second face 12 and a third face 13. The prism 10 is shown receiving a multi-wavelength input beam 14 from an optical source 15. FIG. 1 shows the path through the prism for the components of wavelengths $\lambda$ and $\lambda - \Delta\lambda$. As shown, the component of wavelength $\lambda$ is refracted at the first face 11 and the resulting refracted beam 16 is incident on the second face 12 where it is reflected. The resulting reflected beam 17 is incident on the third face 13 where again it is reflected. The resulting reflected beam 18 is refracted at the second face 12 and the resulting refracted beam 19 is also the output beam. With the prism in the position shown in FIG. 1, the output beam 19 has no deviation from the input beam 14 and so, by providing a suitable discriminating aperture in the path of the output beam, the beam 19 may be isolated. The prism 10 may be rotated in order to isolate other components of the beam 14 in a similar manner.

Figure 2:
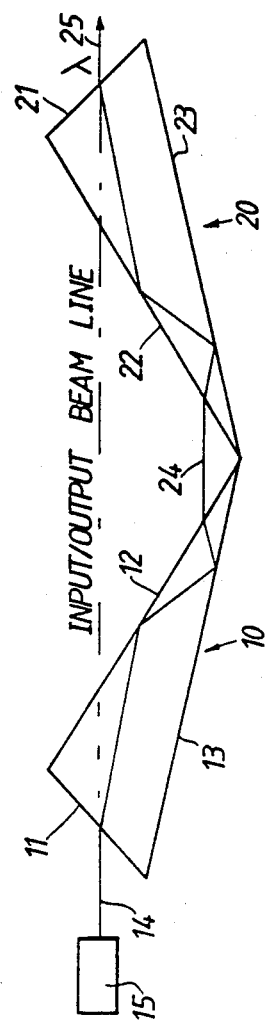
FIG. 2 is a diagram of a two prism arrangement embodying this invention.

In FIG. 1, the output beam 19 is offset with respect to the input beam 14. In FIG. 2, there is shown an arrangement in which a second prism 20 is positioned in series with the first prism 10. The second prism 20 is of identical shape to the first prism 10 and as may be seen has a first face 21, a second face 22 and a third face 23. In the position shown, the component of wavelength $\lambda$ emerges as an output beam 24 from the second face 12 of prism 10 and is incident on the second face 22 of prism 20. This component then emerges from the first face of prism 20 as an output beam 25 which has zero deviation and zero offset from the input beam 14. By imparting equal but opposite rotation to the two prisms 10 and 20, other components of the beam 14 can be made to pass through the prisms 10 and 20 without deviation or offset.

In FIG. 1, the prism 10 is shown in the position of minimum deviation for the component $\lambda$ and consequently the input angle $I_1$ for the beam 14 is equal to the output angle $I_2$ for the output beam 19. In this position, the angle of inclination A between the first face 11 and the second face 12 and the angle of inclination B between the second face 12 and the third face 13 are given by the following two equations:

$$A = 2I_1 \tag{1}$$

$$B = I_1 - R \tag{2}$$

Equation 1 follows from the equality between angles $I_1$ and $I_2$. In equation 2, R denotes the angle of refraction of the beam 16 at the first face 11 and equation 2 follows from the overall geometry of the prism.

The angle C between the beam 16 and the second face 12 must clearly be positive and so the prism 10 is also subject to the following condition:

$$90° + R > 2I_1 \qquad (3)$$

To provide low optical insertion loss for the prism for P polarised light, it is advantageous that $I_1$ and $I_2$ are approximately equal and close to the Brewsters angle. Under these circumstances the maximum refractive index for the material from which the prism can be made is given by equation (3) as approximately 1.73.

If a prism is designed to operate at minimum deviation and zero deviation for a particular wavelength, it will not be possible to isolate shorter wavelengths without deviation. For example, the prism shown in FIG. 1 is operating at minimum deviation and zero deviation for the component λ. Consequently, the minimum possible deviation for the component $\lambda - \Delta\lambda$ will have a deviation greater than zero when the prism is rotated to the position of minimum deviation for this wavelength and so the component $\lambda - \Delta\lambda$ cannot be isolated without deviation. If it is desired to use the prism 10 with approximate equality between the input and output angles $I_1$ and $I_2$, the prism will operate near minimum deviation and therefore should be designed to operate at both minimum deviation and zero deviation for the shortest wavelength with which it is to be used. Equations (1) and (2) should be fulfilled for this wavelength.

By way of a specific example, in the arrangement shown in FIG. 2 the optical source 15 may be a Nd-YAG laser using non-linear crystals to generate radiation at wavelengths of 1064 nm, 532 nm and 355 nm, these wavelengths corresponding to the first, second and third harmonics respectively. If the prisms 10 and 20 are designed to operate at Brewster's angle for the third harmonic wavelength, this will result in high reflection losses when the prisms are tuned as far away from the minimum deviation as required to isolate the first harmonic. By designing the prisms to operate at an angle of incidence less than Brewsters angle for the third harmonic wavelength, reflection losses at longer wavelengths can be reduced. The penalties are a small reduction (approximately 10% in the dispersive power of the prisms and introduction of reflection losses for the third harmonic beam. If the prism is made from fused silica, a near optimised scheme results if the prism angles A and B are 106° and 20.25° respectively. With these angles, the P polaristion reflection losses for the two prisms together are approximately as follows:

| Wave Length | Total Reflection Loss |
| --- | --- |
| 1st Harmonic | 5.6% |
| 2nd Harmonic | 3.0% |
| 3rd Harmonic | 0.4% |

Referring now to FIGS. 3 and 4, there is shown a detailed drawing of the two prism arrangement of FIG. 2. As shown, the overall arrangement includes a base 30 on which is mounted a cover 31. Inside the cover 31, each of the prisms 10 and 20 is mounted on a respective platform 32 by means of a respective clamp 33. Each of the platforms 32 is rotatably mounted on a respective shaft 34 which is secured to a respective T-shaped member 36 retained in a T-shaped slot 35 formed in base 30. Each T-shaped member 36 is urged outwardly by a respective spring 37 positioned in a respective bore 38.

The inner ends of platforms 32 are rotatably mounted on a common shaft 40 secured to a T-shaped member 41 which slides in a T-shaped groove 42. The T-shaped member 41 is pushed against the end of a shaft 44 by the action of the springs 33. The shaft 44 is threaded into a clamp 45 and driven by a micrometer knob 47.

In operation, the micrometer knob 47 is rotated thereby imparting equal but opposite rotation to the two platforms 32 and consequently to the prisms 10 and 20. The cover 31 is provided with apertures to permit passage of the input and output beams 14 and 25.

The prism arrangements described are suitable for use as part of a laser resonator for selecting the wavelength at which the laser oscillates.

I claim:

1. A dispersive prism arrangement comprising a rotatably mounted prism having three faces which are inclined to each other so that when an input beam of a particular wavelength is incident on the first face the prism may be rotated to a position where the incident beam is refracted at the first face, the refracted beam from the first face is incident on the second face where it is reflected, the reflected beam from the second face is incident on the third face where it is reflected, the reflected beam from the third face is incident on the second face where it is refracted to form an output beam, and the output beam is at zero deviation from the input beam.

2. A dispersive prism arrangement as claimed in claim 1, further including means for producing a multi-wavelength beam which is incident on the first face of the prism.

3. A dispersive prism arrangement as claimed in claim 2, in which the three faces of the prism are inclined to each other so that when the prism is rotated to a position where the shortest wavelength component of the beam emerges from the second face without deviation from the input beam the angle of inclination between the first and second faces is equal to twice the input angle at the first face and the angle of inclination between the second and third faces is equal to the difference between the input angle at the first face and the angle of reflection at the first face.

4. A prism arrangement as claimed in any one of the preceding claims, further including a second rotatably mounted prism having three faces inclined to each other at the same angles as in the first prism, the two prisms being mounted with respect to each other so that an output beam from the second face of one prism is incident on the second face of the other prism.

5. A prism arrangement as claimed in claim 4, further including a device for imparting equal but opposite rotation to the two prisms.

6. A prism arrangement comprising a pair of identical prisms, each of which has three faces, the two prisms being rotatably mounted in a common plane and symmetrically disposed about a central point, and means for imparting equal but opposite rotation to the two prisms.

* * * * *